(12) United States Patent
Cimpu et al.

(10) Patent No.: US 11,617,087 B2
(45) Date of Patent: Mar. 28, 2023

(54) METHOD AND APPARATUS FOR HANDLING INTERFERENCE CONNECTION TYPES IN CITIZENS BROADBAND RADIO SERVICE DEVICES BAND

(71) Applicant: Telefonaktiebolaget LM Ericsson (publ), Stockholm (SE)

(72) Inventors: Virgil Cimpu, Ottawa (CA); Kumar Balachandran, Pleasanton, CA (US); Gary Boudreau, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 164 days.

(21) Appl. No.: 16/478,992

(22) PCT Filed: Sep. 21, 2018

(86) PCT No.: PCT/IB2018/057331
§ 371 (c)(1),
(2) Date: Jul. 18, 2019

(87) PCT Pub. No.: WO2019/058331
PCT Pub. Date: Mar. 28, 2019

(65) Prior Publication Data
US 2019/0335336 A1    Oct. 31, 2019

Related U.S. Application Data

(60) Provisional application No. 62/561,485, filed on Sep. 21, 2017.

(51) Int. Cl.
H04W 72/04    (2009.01)
H04W 72/08    (2009.01)
(Continued)

(52) U.S. Cl.
CPC ......... H04W 16/10 (2013.01); H04L 27/2607 (2013.01); H04W 16/14 (2013.01);
(Continued)

(58) Field of Classification Search
CPC ..... H04W 16/10; H04W 16/14; H04W 28/16; H04W 72/0453; H04W 72/082; H04L 27/2607
See application file for complete search history.

(56) References Cited

U.S. PATENT DOCUMENTS 8,134,990 B2 *   3/2012   Kangas ............... G01S 5/02216
                                                          370/441
9,491,715 B2 *   11/2016  Wigren ............... H04W 52/243
(Continued)

FOREIGN PATENT DOCUMENTS

WO    2016/195751 A1    12/2016
WO    2016195751 A1     12/2016
(Continued)

OTHER PUBLICATIONS

International Search Report & Written Opinion of the International Searching Authority dated Dec. 13, 2018 and issued in PCT Application No. PCT/IB2018/057331, consisting of 15 pages.
(Continued)

*Primary Examiner* — Khaled M Kassim
*Assistant Examiner* — Berhanu D Belete
(74) *Attorney, Agent, or Firm* — Christopher & Weisberg, P.A.

(57) ABSTRACT

A method and network node for classification of interference connections between Citizens Broadband Radio Service Devices, CBSDs, in a wireless communication network are provided. According to one aspect, a method includes calculating an interference level, the calculation being based on whether two interfering CBSDs are operating in one of the
(Continued)

alternate channels, adjacent channels and the same channel. The method also includes comparing the calculated interference level to a threshold to determine a classification of an interference connection.

20 Claims, 13 Drawing Sheets

(51) Int. Cl.
    *H04W 16/10*       (2009.01)
    *H04L 27/26*       (2006.01)
    *H04W 16/14*       (2009.01)
    *H04W 28/16*       (2009.01)
    *H04W 72/0453*     (2023.01)

(52) U.S. Cl.
    CPC ....... *H04W 28/16* (2013.01); *H04W 72/0453* (2013.01); *H04W 72/082* (2013.01)

(56) References Cited

U.S. PATENT DOCUMENTS

| | | | |
|---|---|---|---|
| 10,880,901 B2* | 12/2020 | Abdelmonem | H04B 17/345 |
| 2009/0191906 A1* | 7/2009 | Abedi | H04W 16/14 |
| | | | 455/501 |
| 2009/0197627 A1* | 8/2009 | Kuffner | H04W 52/30 |
| | | | 455/522 |
| 2011/0143773 A1* | 6/2011 | Kangas | G01S 5/02216 |
| | | | 455/422.1 |
| 2011/0305189 A1* | 12/2011 | Chen | H04B 7/15592 |
| | | | 455/7 |
| 2013/0208587 A1* | 8/2013 | Bala | H04W 72/0446 |
| | | | 370/278 |
| 2014/0301237 A1* | 10/2014 | Yi | H04W 16/14 |
| | | | 370/252 |
| 2015/0141069 A1* | 5/2015 | Wigren | H04W 52/343 |
| | | | 455/522 |
| 2015/0382362 A1* | 12/2015 | Park | H04L 1/1845 |
| | | | 370/330 |
| 2016/0212624 A1* | 7/2016 | Mueck | G06F 16/9537 |
| 2016/0270089 A1 | 9/2016 | Olfat et al. | |
| 2017/0188241 A1 | 6/2017 | Mueck et al. | |
| 2017/0195887 A1* | 7/2017 | Jovancevic | H04W 16/14 |
| 2017/0208454 A1* | 7/2017 | Knisely | H04W 72/082 |
| 2017/0238136 A1* | 8/2017 | Smith | H04M 1/72421 |
| | | | 455/456.3 |
| 2018/0014304 A1* | 1/2018 | Khoshnevisan | H04W 72/0453 |
| 2018/0063844 A1* | 3/2018 | Khoshnevisan | H04W 72/048 |
| 2018/0132111 A1* | 5/2018 | Mueck | H04B 1/715 |
| 2018/0139616 A1* | 5/2018 | Khoshnevisan | H04W 74/0808 |
| 2018/0146380 A1* | 5/2018 | Srikanteswara | H04W 16/14 |
| 2018/0192295 A1* | 7/2018 | Mueck | H04W 48/06 |
| 2018/0192449 A1* | 7/2018 | Mueck | H04W 48/20 |
| 2018/0279316 A1* | 9/2018 | Mueck | H04B 17/345 |
| 2018/0288621 A1* | 10/2018 | Markwart | H04W 16/14 |
| 2018/0376341 A1* | 12/2018 | Khoshnevisan | H04L 5/001 |
| 2019/0044614 A1* | 2/2019 | Khoshnevisan | H04B 7/2646 |
| 2019/0058999 A1* | 2/2019 | Gunasekara | H04W 16/14 |
| 2019/0215698 A1* | 7/2019 | Balachandran | H04W 28/26 |
| 2019/0222339 A1* | 7/2019 | Badic | H04W 16/14 |
| 2019/0327765 A1* | 10/2019 | Mukherjee | H04W 16/14 |
| 2020/0236685 A1* | 7/2020 | Mueck | H04W 24/02 |

FOREIGN PATENT DOCUMENTS

| | | | | |
|---|---|---|---|---|
| WO | 2017/065852 A1 | | 4/2017 | |
| WO | WO-2017065852 A1 | * | 4/2017 | ............ H04W 16/14 |

OTHER PUBLICATIONS

Ericsson: CBRS Alliance Confidential "Problem Formulation for Coordination of Dual TDD Configurations"; Aug. 24, 2017, consisting of 15 pages.
CBRS Alliance, Technical Working Group, Coexistence Task Group: "CBRS Coexistence Technical Report", Version V0.6. Jul. 24, 2017, Consisting of 21 pages.
International Preliminary Report on Patentability issued in PCT Application No. PCT/IB2018/057331 dated Nov. 15, 2019, consisting of 35 pages.
Communication Pursuant to Article 94(3) EPC issued in EP Application No. 18793461.7 dated Dec. 7, 2020, consisting of 9 pages.

* cited by examiner

METHOD AND APPARATUS FOR HANDLING INTERFERENCE CONNECTION TYPES IN CITIZENS BROADBAND RADIO SERVICE DEVICES BAND

CROSS-REFERENCE TO RELATED APPLICATIONS

This application is a Submission Under 35 U.S.C. § 371 for U.S. National Stage Patent Application of International Application No.: PCT/IB2018/057331, filed Sep. 21, 2018 entitled "METHOD AND APPARATUS FOR HANDLING INTERFERENCE CONNECTION TYPES IN CITIZENS BROADBAND RADIO SERVICE DEVICES BAND," which claims priority to U.S. Provisional Application No.: 62/561,485, filed Sep. 21, 2017, entitled "METHOD AND APPARATUS FOR HANDLING INTERFERENCE CONNECTION TYPES IN CBRS BAND," the entireties of both of which are incorporated herein by reference.

TECHNICAL FIELD

This disclosure relates to wireless communications, and in particular, to the classification of interference connections between Citizens Broadband Radio Service Devices, CBSDs, and making channel assignments based on the classification of interference connections.

BACKGROUND

The advance of mobile cellular networks and the popularity of mobile devices combined with the constant growth in user throughput have created a huge demand for one resource: wireless communication spectrum (referred to herein as "spectrum").

There are three main approaches to spectrum management:
- License the spectrum to operators, who will pay significant fees for the privilege of using dedicated spectrum;
- Unlicensed spectrum where devices are sharing the same spectrum using a set of predetermined rules aimed at ensuring fair spectrum access; and
- Shared spectrum, e.g., Licensed Shared Access (LSA) or Authorized Shared Access (ASA), usually proposing a division of rights of use, based on time of use or geographical constraints between mobile operators and possibly an incumbent user.

A typical use of the shared spectrum approach is to enable the use of a band that is available for licensed users in some markets but is being restricted in others because of incumbents such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas and is the reasonable regulatory approach to ASA.

The creation in the United States of the new Citizens Broadband Radio Service (CBRS) in the 3.5 GHz band, currently occupied by incumbents like the Department of Defense, will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another.

Sharing in the 3.5 GHz band occurs between three tiers of users. Access to the spectrum is governed by a Spectrum Access System (SAS) that implements a geolocation database and policy management function to be used to protect incumbents as well as implement a tiered access framework. Incumbent users (i.e., incumbent wireless devices, systems, etc.) represent the highest tier in this framework and receive interference protection from Citizens Broadband Radio Service users (i.e., wireless device service by CBSDs). Protected incumbents include the federal operations described above, as well as Fixed Satellite Service (FSS) and, for a finite period, grandfathered terrestrial wireless operations in the 3650-3700 MHz portion of the band.

The Citizens Broadband Radio Service itself consists of two tiers—Priority Access and General Authorized Access (GAA)—both authorized in any given location and frequency by a SAS. As the name suggests, Priority Access operations receive protection from GAA operations. Priority Access Licenses (PALs), defined, for example, as an authorization to use a 10 MHz channel in a single census tract for three years, will be assigned in up to 70 megahertz of the 3550-3650 MHz portion of the band. GAA use may be allowed, by rule, throughout the 150 MHz band. GAA users (i.e., wireless devices) may receive no interference protection from other Citizens Broadband Radio Service wireless devices. The 150 MHz band has been designed for deployment of small cells, although there is sufficient capability in the rules to provision wide area macro deployments as well.

FIG. 1 illustrates the spectrum anatomy for the 3.5 GHz Citizens Broadband Radio Service where the band for this service can be shared by multiple network operators and wireless devices can be sectioned into tiered service levels. A Citizens Broadband Radio Service Devices (CBSDs) may first register with the SAS and provide their location information among other registration parameters to the SAS, and then the CBSDs may request that the SAS grant access in a certain channel. Before granting access, the SAS may use information from the Environmental Sensing Capability (ESC) network to detect incumbent activity in the area where CBSD operates. The SAS may also use measurement reports from the other CBSDs in the same area to determine the level of interference in a certain channel as well as if the channel needs to be protected due to PAL user activity. The SAS Architecture 1 is depicted in FIG. 2. In particular, SAS architecture 1 includes one or more CBSDs 2a-2d (referred to generally as CBSD 2) in communication with a domain proxy 3. In one or more embodiments, EMS 4 is used to manage CBDS 2 where EMS 4 may be optional in the SAS architecture 1. In one or more embodiments, CBSD sensing 5 is optional in the SAS architecture 1. CBSD 2d is in communication with SAS 6a via the SAS-user interface. SAS 6a may use incumbent information 7 and incumbent detection (ESC) 8 for providing the incumbent user (e.g., wireless device, systems, etc.) access to the spectrum. SAS 6a may be in communication with SAS 6b and/or Federal Communication Commission (FCC) databases 9 via the SAS-SAS interface.

The incumbent users/systems in the 3550-3700 Mhz band ("150 MHz band") may include coastal and terrestrial radar and FSS. The coastal regions are covered by the Environmental Sensing Component (ESC) made up of a set of sensors and a detection system that will detect the presence of radar from a distance of X-65 nautical miles (approximately 120 km) from the shoreline. A detection event will cause the SAS to reconfigure CBSDs placed within defined exclusion zones near the coastline. Reconfiguration includes termination of transmission rights for a CBSD 2 and also includes reduction of power or reallocation of new spectrum.

The 150 MHz band allows the establishment of 0-7 PALs for each of over 74,000 census tracts in the United States as established in the 2010 census. The PALs may be associated with spectrum allocations by the SAS 6 within the range 3550-3650 MHz and correspond to a 10 MHz assignment per license. The SAS 6 may try to place multiple PALs adjacent to each other if so preferred by the CBSD 2.

A PAL user can protect a registered deployment of CBSDs 2 within a PAL Protection Area (PPA) that is at most bounded by an area that is bounded by a contour representing a −96 dBm signal level. A PPA can overlap parts of multiple census tracts. While a PPA is atomically defined with respect to the coverage of a single CBSD 2, a composite PPA can be constructed by combining the coverage areas of geographically proximate CBSDs 2 as shown in FIG. 3.

In particular, FIG. 3 shows an example of PPAs constructed as a set of vertices of a polygon (e.g. each vertex located as latitude, longitude and optionally an altitude above mean sea level or ground level), where FIGS. 4-6 show examples of protection criteria for PALS with respect to two tracts. The PPA is restricted to lie within a coverage contour for the CBSD 2 signal, a maximum coverage determined by the −96 dBm/10 MHz contour. All SASs 6 may have a consistent methodology for determining coverage. The PPA is typically requested by the CBSD 2 towards the serving SAS 6, and the serving SAS 6 authorizes the PPA after validation of the request associated with the PAL.

The SAS 6 only protects the PAL to an aggregate interference level of −80 dBm, for example. In the case of a long term evolution (LTE) deployment, this signifies that the usable coverage contour may be much smaller than the PPA, especially if the interference level is at the limit, and a CBSD 2 may not be able to operate close to receiver sensitivity. A PAL is protected within the bounds of the PPA, but co-channel assignments to GAA users (i.e., wireless devices, systems, etc.) within the census tract are possible if the SAS can determine that the interference limits within the PPA will not be exceeded. Such frequency allocations may occur from several SASs 6, especially in census tracts within highly populated metropolitan areas.

The FCC has included requirements regarding the transmission mask for a CBSD 2, i.e., transmission mask for a network node. The emission requirements are illustrated in FIG. 7 and described below:
  below −13 dBm/MHz conducted level in adjacent channel,
  below −25 dBm/MHz conducted level in band, beyond adjacent channel (referred herewith as alternate channel requirements), and
  below −40 dBm/MHz out of band limits (referred to as out of band emission (OOBE) requirements).

All radio devices seeking permission to operate in the CBRS band will have to meet these and/or other emission requirements. FIG. 8 illustrates one or more problems that radio manufacturers may endure when trying to design radio equipment to meet these emission requirements:
  Non-linearities will cause the ideal spectrum to spread in a phenomenon known as spectrum regrowth.
    a) Amplification causes spectral regrowth beyond the first alternate channel causing the PSD to be flat past a certain point even after digital pre-distortion to compensate for amplifier non-linearities.
  Filtering at the receiver front-end is at band level and will not suppress interference that is in-band.

In other words, the signal after Baseband/digital and D/A processing is altered by the mixing process where the signal is then altered again by the amplification process performed by a power amplifier (PA). These alternations to the signal may violate emission requirements as illustrated in FIG. 9, where these alterations may be caused to one or more radio properties with respect to the band.

3GPP has defined B48 for the LTE time division duplex (TDD) devices operating in CBRS band and is working towards introducing B49 for LTE-license assisted access (LAA) devices.

The CBRS Alliance was formed to advocate for the use of LTE technology in the CBRS 3.5 GHz band, as well as to specify methods of improving LTE performance in a shared spectrum deployment. The CBRS alliance has published a technical report for co-existence of network and devices using LTE technology and is in the process of expanding the report into detailed technical specifications. In the concept, CBRS Alliance is introducing a Coexistence Manager (CxM) which will be in charge of assigning channels to a group of CBSDs that declare themselves as compatible with one another for the purposes of interference mitigation. The group is generally referred to as a Coexistence group (CxG) and may, e.g., be composed of LTE CBSDs belonging to the CxG CBRS_ALLIANCE_CXG that have passed compliance with certification by the CBRS Alliance. The CxM manages these CBSDs in a way that minimizes inter-CBSD interference as well as protects the incumbent users and the higher tier users (e.g., wireless devices, systems, etc.). CBRS Alliance is also defining additional rules for the CxG CBRS_ALLIANCE_CXG:
  All TDD deployments in the band may be cell phase synchronized and may have frame timing derived from a common time reference.
  There are two mandated TDD configurations: TDD Config 2 and TDD Config 1.
  Other TDD configurations can be used only when the deployment is isolated or when all the network operators in the area agree to use a particular configuration. Otherwise, the CxM may default to one of the mandated configurations.
  Connected sets are used to determine where the CBRS spectrum can be re-used and where it may be required to be divided between different network deployments to ensure coexistence. Connected sets are built by evaluating if the CBDSs 2 will interfere with each other, for example, two CBDS 2 that have overlapping coverage are deemed to be connected. Independent connected sets may each access the entire CBRS spectrum, but within a connected set, the spectrum has to be divided between different deployments.

A CxG may also consider subsets of CBSDs 2 that declare themselves as part of an Interference Coordination Group (ICG), defined as CBSDs 2 that are able to manage interference between themselves and do not need the CxM to orthogonalize channels between individual nodes in the ICG. Additionally, the CxG may comprise of one or more Common Channel Groups (CCG) that are defined as CBSDs 2 that desire a common channel assignment from the SAS, that the CxM may assume in determining channel allocations within the CxG.

The SASs create a global set of connected sets that encompass all the CBSDs 2 under management by a SAS 6. Each managing SAS 6 creates a connected set that is consolidated with the connected sets of other SASs 6. The SAS 6 then isolates the subsets of each connected set that belongs to a CxG, with each unaffiliated CBSD 2 being assigned to a unique CxG. Then the available pool of spectrum for GAA is divided between the various sub-connected sets formed on behalf of each CxG. One method of dividing this spectrum is to proportion the allocation in the same ratio as the number of CBSDs 2 in the connected set, while another method may consider the coverage of individual CBSDs 2 (in proportion to deployment height and power level as well). The CxMs may then further divide spectrum among the constituent CBSDs 2.

Coexistence in the CBRS band is a topic being actively discussed in the WinnForum and the CBRS Alliance. Minimizing inter-CBSD interference is a factor in the success of the band where uncoordinated deployments may have to coexist. The coexistence effort is heavily impacted by the transmission properties and deployment topologies of the real radio devices operating in the CBRS band.

Finding a solution that may fit all deployments scenarios, including the use of different TDD configurations, may be difficult. Different tools can be used to solve coexistence in different scenarios such as:

- Increasing the distance between CBSDs 2. However, this solution is not very practical because network operators rarely have the freedom to place base stations at desirable locations;
- Electro-magnetically isolating CBSDs 2 from each other but this solution is complex and potentially costly to implement;
- Lowering CBSD 2 output power but this solution is not ideal since it will lead to potential coverage gaps and impaired mobility;
- Assigning different spectrum/channels but this solution can still cause interference problems if CBSDs 2 are in close proximity to each other; and/or
- Using guard bands between the channels but due to transmission properties of the real radio devices as illustrated in FIG. 8, the guard band might not prevent interference situations for this solution.

SUMMARY

Some embodiments provide a classification of scenarios where different interference mitigation tools can be used. This classification can be used by the SAS or CxM to apply one or more interference solutions. Some embodiments provide for the classification of interference scenarios where different interference mitigation tools can be used in the different scenarios.

According to one aspect of the disclosure, a network node for classification of interference connections between Citizens Broadband Radio Service Devices, CBSDs, in a wireless communication network is provided. The network node includes processing circuitry configured to: calculate an interference level where the calculation is based at least in part on whether two interfering CBSDs are operating in one of alternate channels, adjacent channels and the same channel; compare the calculated interference level to a threshold to determine a classification of an interference connection; and perform at least one action based on the classification of the interference connection.

According to one embodiment of this aspect, the at least one action includes performing channel assignments based on the classification of interference connections. According to one embodiment of this aspect, the interference connection between the two interfering CBSDs does not allow the CBSDs to operate in a Citizen's Broadband Radio Service, CBRS, band without incurring interference above a predefined threshold if the CBSDs are part of different coexistence groups or the CBSDs use different radio access technologies, RATs.

According to one embodiment of this aspect, the interference connection between the two interfering CBSDs does not allow the CBSDs to operate in the Citizen's Broadband Radio Service, CBRS, band without incurring interference about a predefined threshold if the CBSDs have overlapping downlink and uplink cycles, regardless of the existence of a guard band between channels assigned to the CBSDs. According to one embodiment of this aspect, the interference connection between the two interfering CBSDs does not allow the CBSDs to operate in adjacent channels without incurring interference about a predefined threshold if the CBSDs use different RATs or overlapping downlink and uplink cycles.

According to one embodiment of this aspect, the interference connection between the two interfering CBSDs is associated with a guard band greater than a predefined bandwidth. According to one embodiment of this aspect, the interference connection between the two interfering CBSDs does allow CBSDs to operate in different channels without incurring interference above a predefined threshold if CBSDs use different RATs or overlapping downlink and uplink cycle. According to one embodiment of this aspect, the different channels between the CBSDs are orthogonal to each other.

According to one embodiment of this aspect, the interference threshold is one of static, dynamic and based on a probability distribution of received interference levels at the CBSDs. According to one embodiment of this aspect, the at least one action includes applying at least one network policy to reduce interference associated with the CBSDs. According to one embodiment of this aspect, the network node is a spectrum access system, SAS. According to one embodiment of this aspect, the network node is a Coexistence Manager, CxM.

According to another aspect of the disclosure, a method for a network node for classification of interference connections between Citizens Broadband Radio Service Devices, CBSDs, in a wireless communication network is provided. An interference level is calculated where the calculation is based at least in part on whether two interfering CBSDs are operating in one of alternate channels, adjacent channels and the same channel. The calculated interference level is compared to a threshold to determine a classification of an interference connection. At least one action is performed based on the classification of the interference connection.

According to one embodiment of this aspect, the at least one action includes performing channel assignments based on the classification of interference connections. According to one embodiment of this aspect, the interference connection between the two interfering CBSDs does not allow the CBSDs to operate in a Citizen's Broadband Radio Service, CBRS, band without incurring interference above a defined threshold if the CBSDs are part of different coexistence groups or the CBSDs use different radio access technologies, RATs. According to one embodiment of this aspect, the interference connection between the two interfering CBSDs does not allow the CBSDs to operate in a Citizen's Broadband Radio Service, CBRS, band without incurring interference above a predefined threshold if the CBSDs have overlapping downlink and uplink cycles, regardless of the existence of a guard band between channels assigned to the CBSDs.

According to one embodiment of this aspect, the interference connection between the two interfering CBSDs does not allow the CBSDs to operate in adjacent channels without incurring interference above a predefined threshold if the CBSDs use different RATs or overlapping downlink and uplink cycles. According to one embodiment of this aspect, the interference connection between the two interfering CBSDs is associated with a guard band greater than a predefined bandwidth. According to one embodiment of this aspect, the interference connection between the two interfering CBSDs does allow CBSDs to operate in different channels without incurring interference above a predefined threshold if CBSDs use different RATs or overlapping downlink and uplink cycles.

According to one embodiment of this aspect, the different channels between the CBSDs are orthogonal to each other. According to one embodiment of this aspect, the interference threshold is one of static, dynamic and based on a probability distribution of received interference levels at the CBSDs. According to one embodiment of this aspect, the at least one action includes applying at least one network policy to reduce interference associated with the CBSDs. According to one embodiment of this aspect, the network node is a spectrum access system, SAS. According to one embodiment of this aspect, the network node is a Coexistence Manager, CxM.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
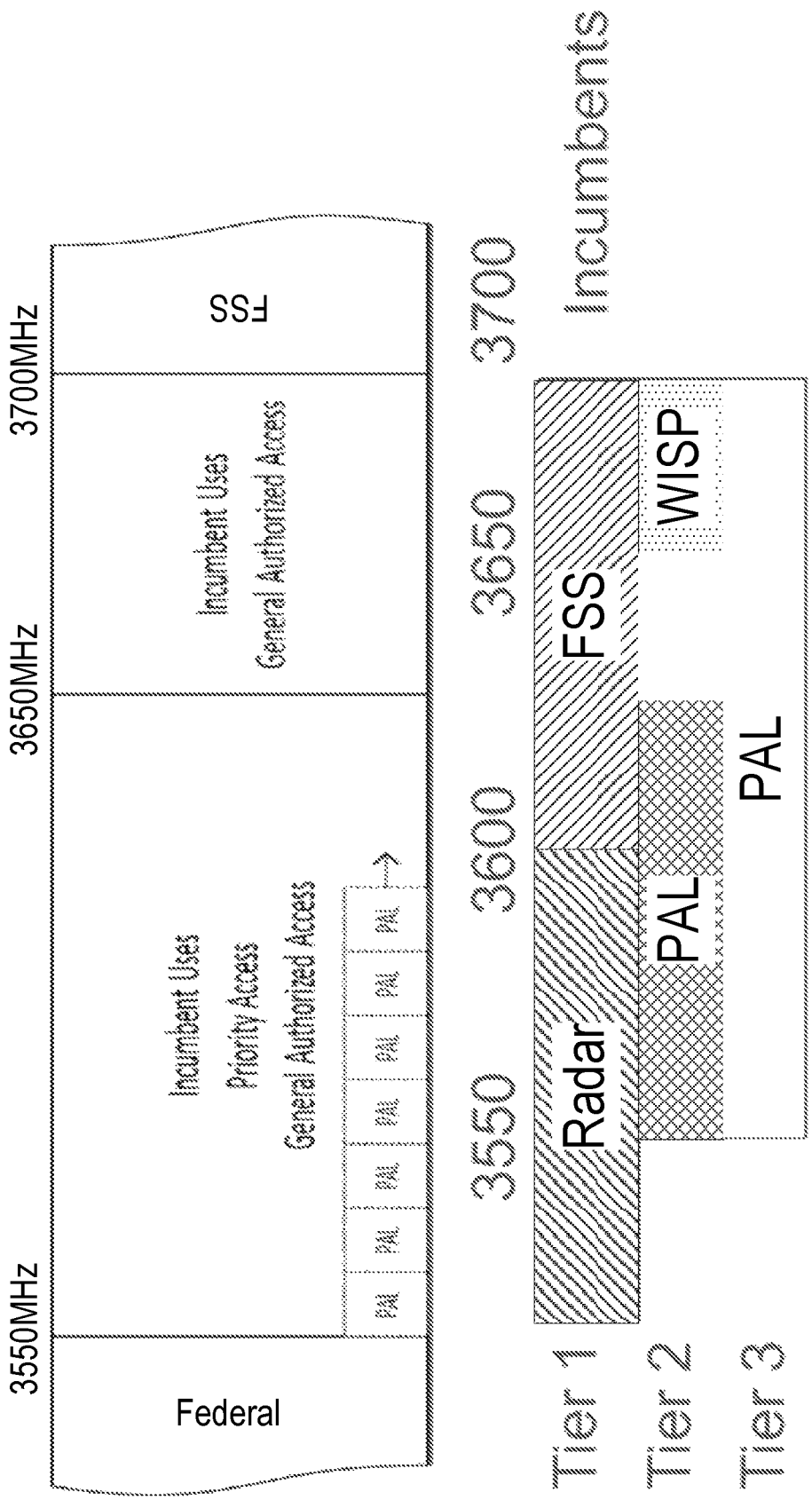
FIG. 1 is a diagram of the spectrum anatomy for the 3.5 GHz Citizens Broadband Radio Service.
Figure 2:
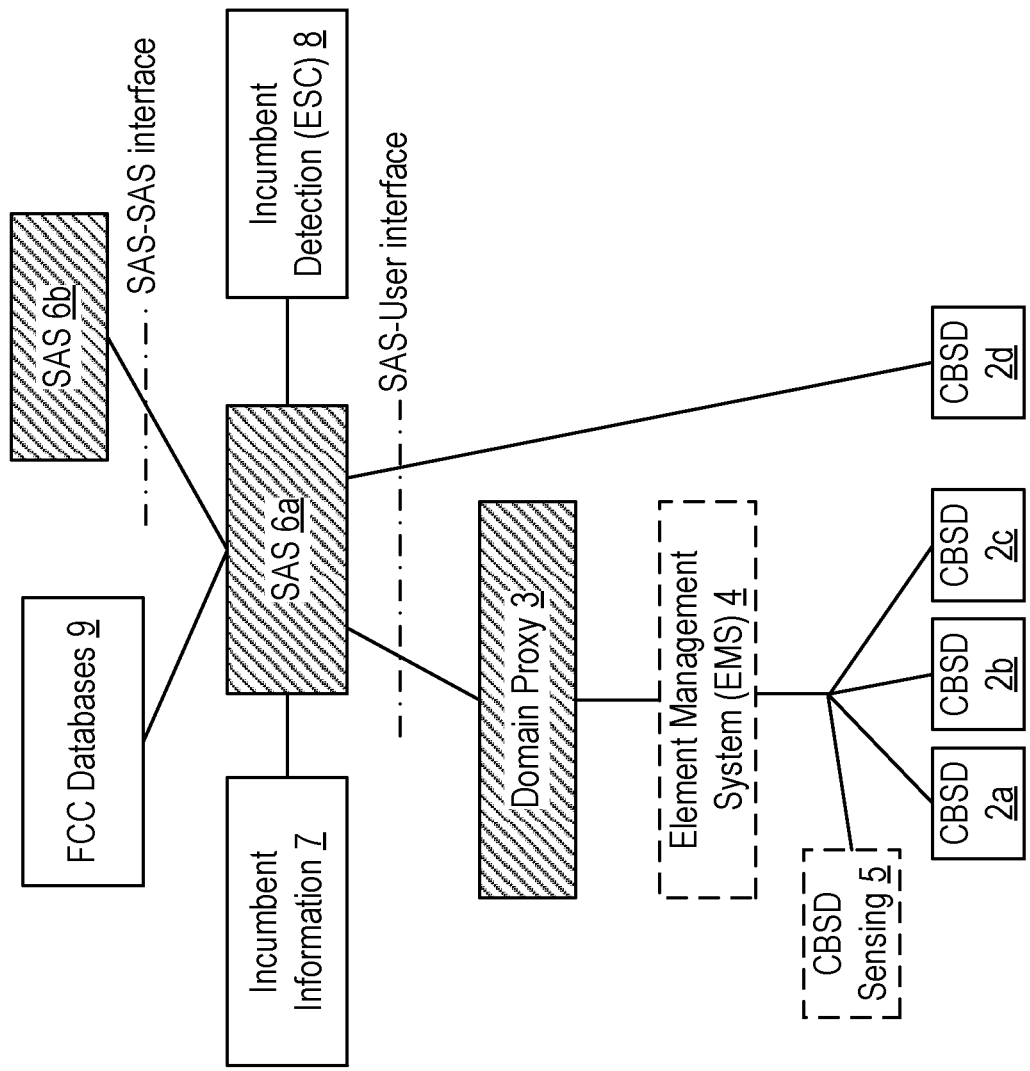
FIG. 2 is a block diagram of SAS architecture.
Figure 3:
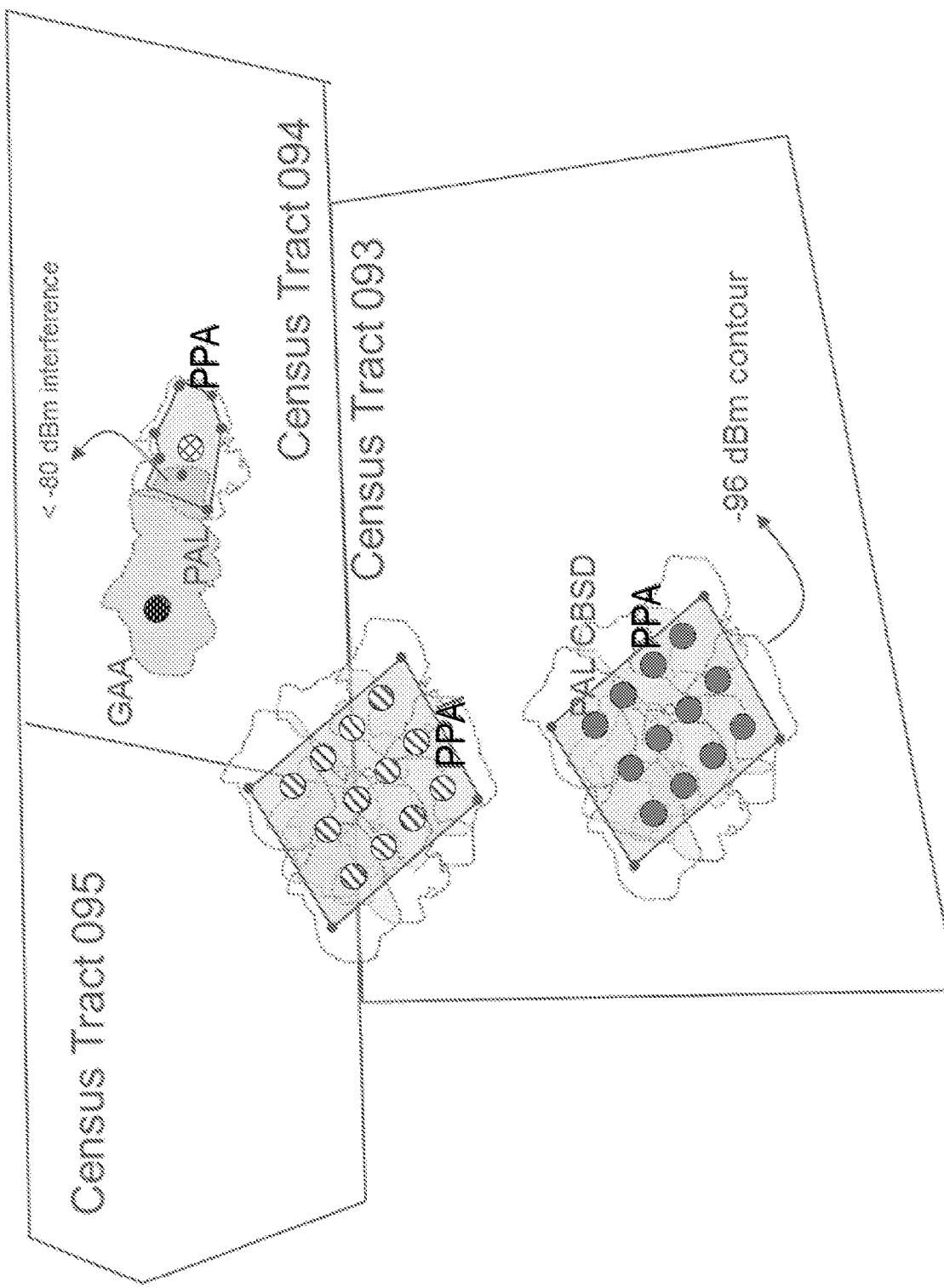
FIG. 3 is a diagram of PAL protection areas.
Figure 4:
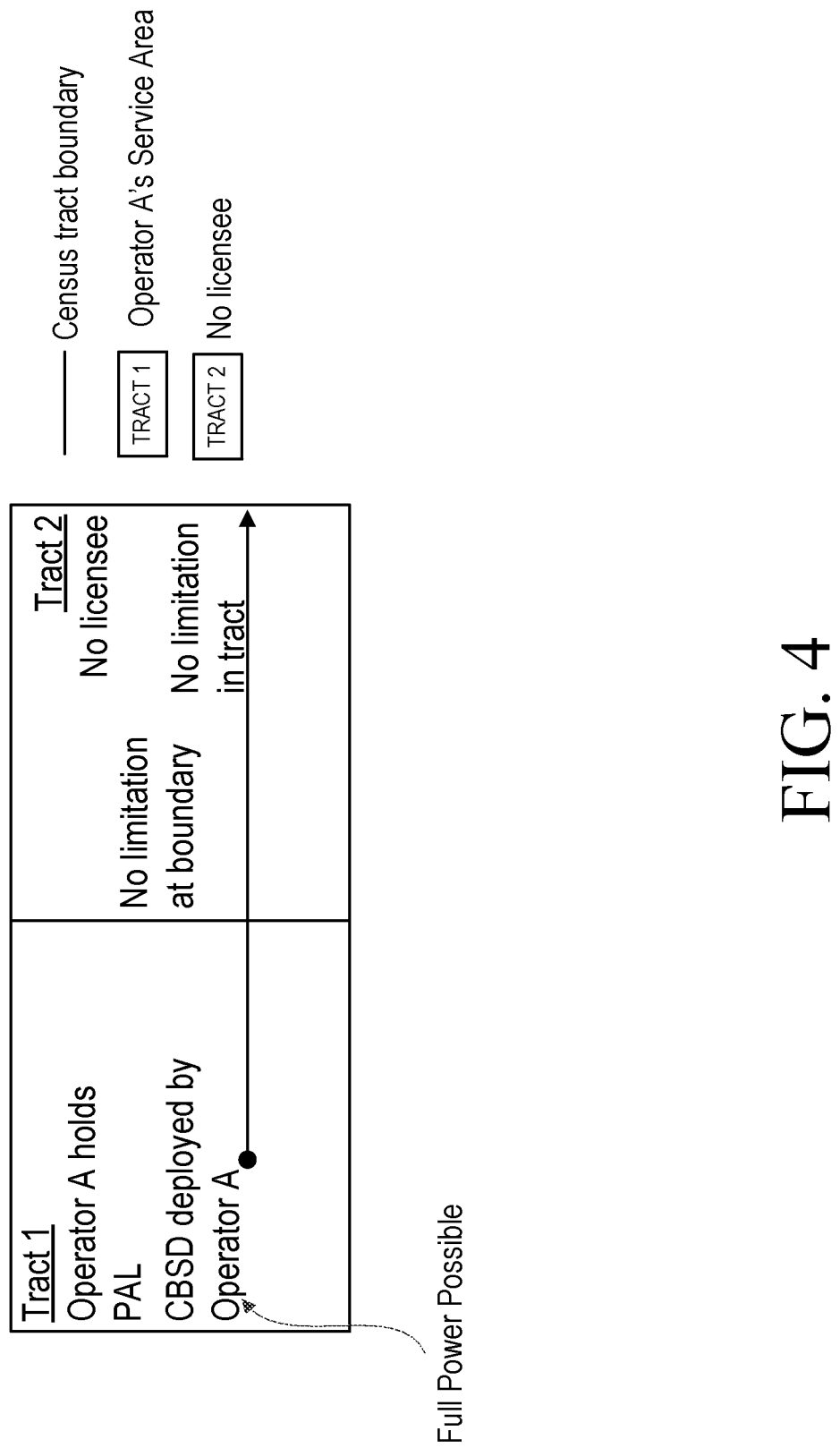
FIG. 4 is a diagram of one example protection criteria for PALS.
Figure 5:
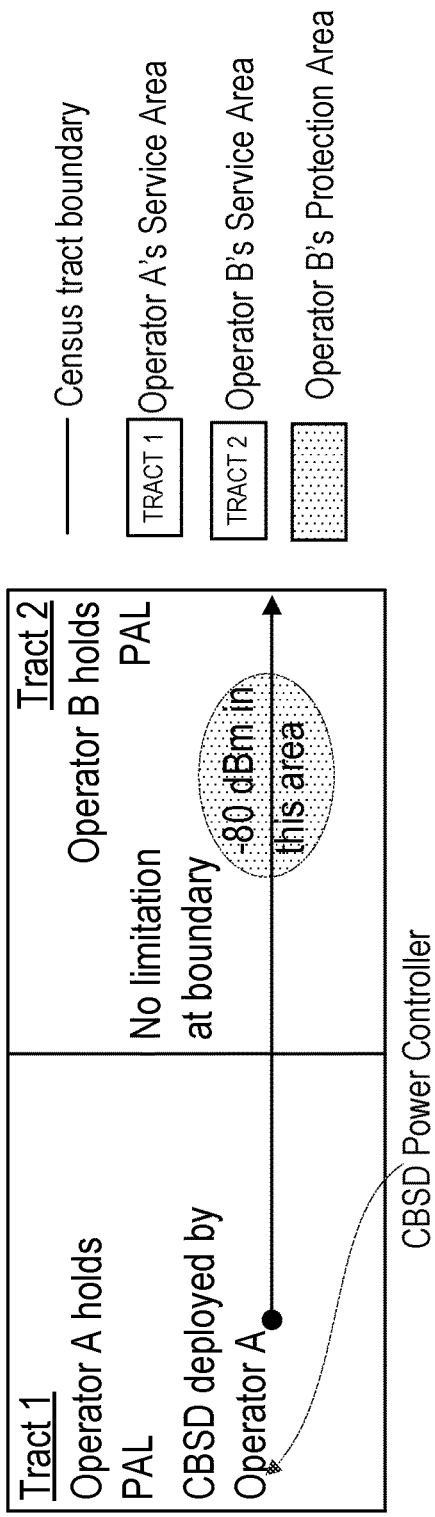
FIG. 5 is a diagram of another example protection criteria for PALS.
Figure 6:
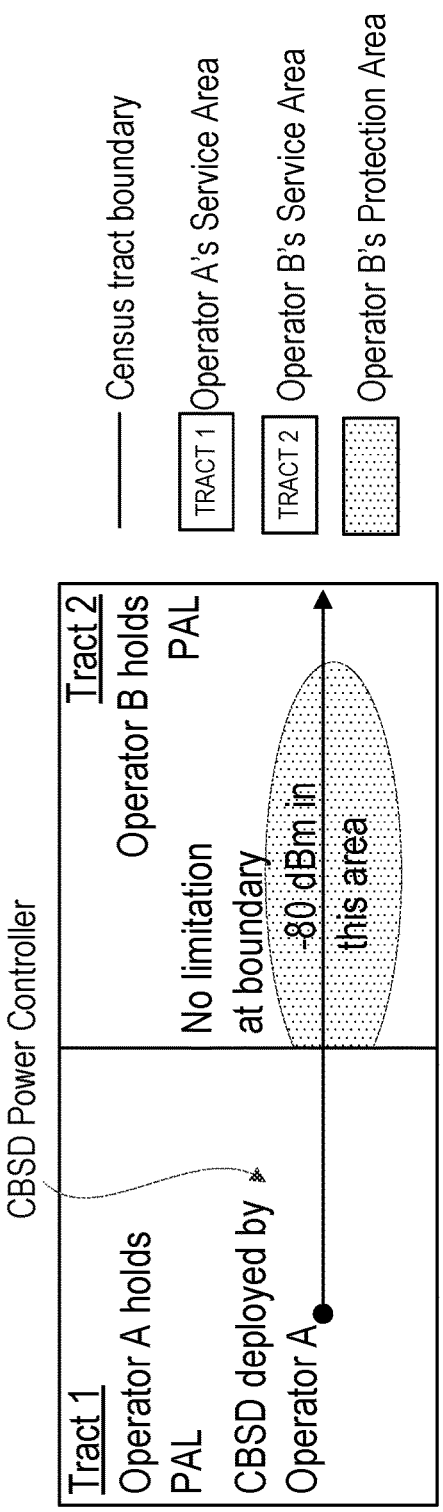
FIG. 6 is a diagram of yet another example protection criteria for PALS.
Figure 7:
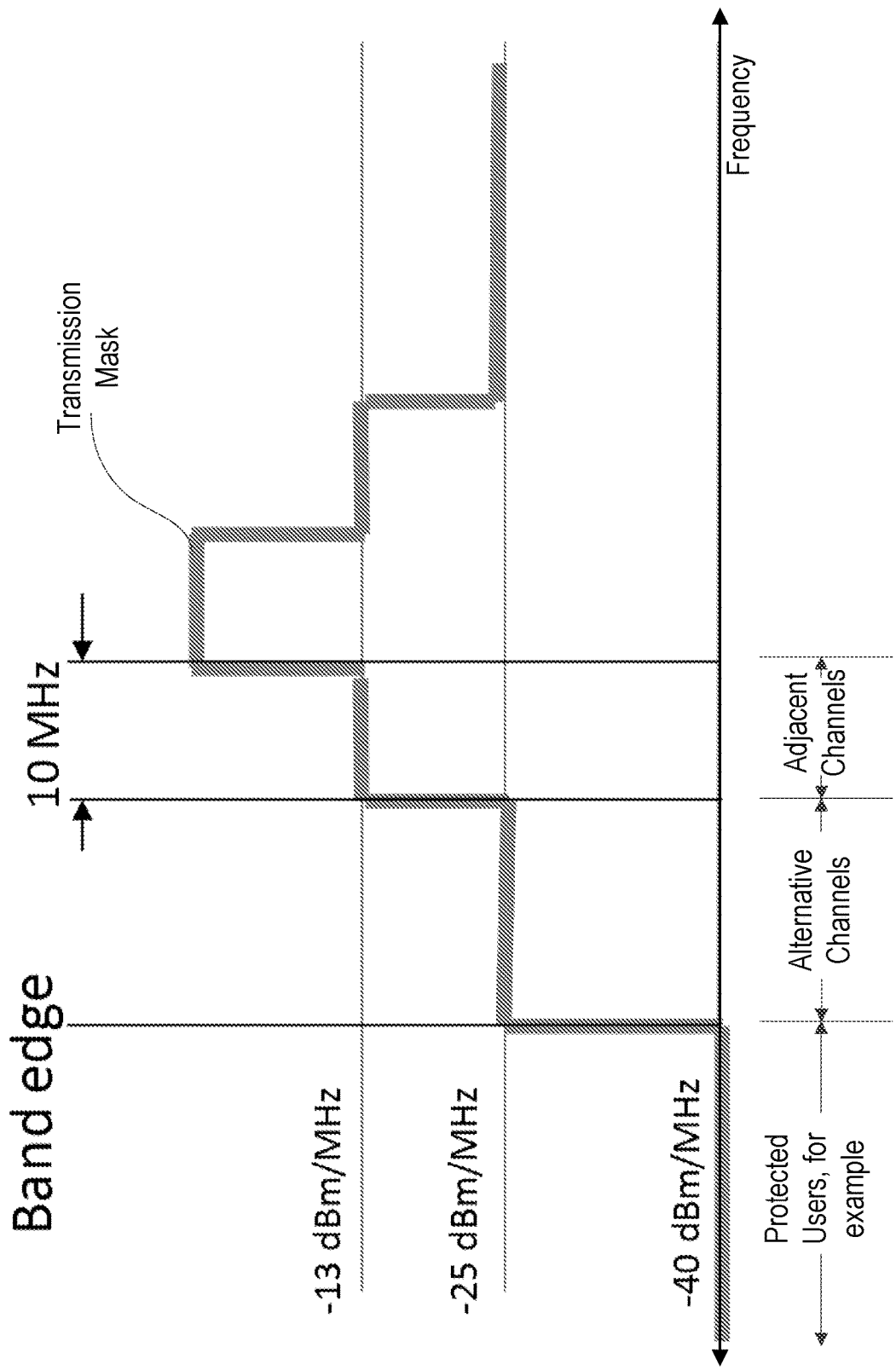
FIG. 7 is a diagram of a transmission mask according to CBSD emission requirements.
Figure 8:
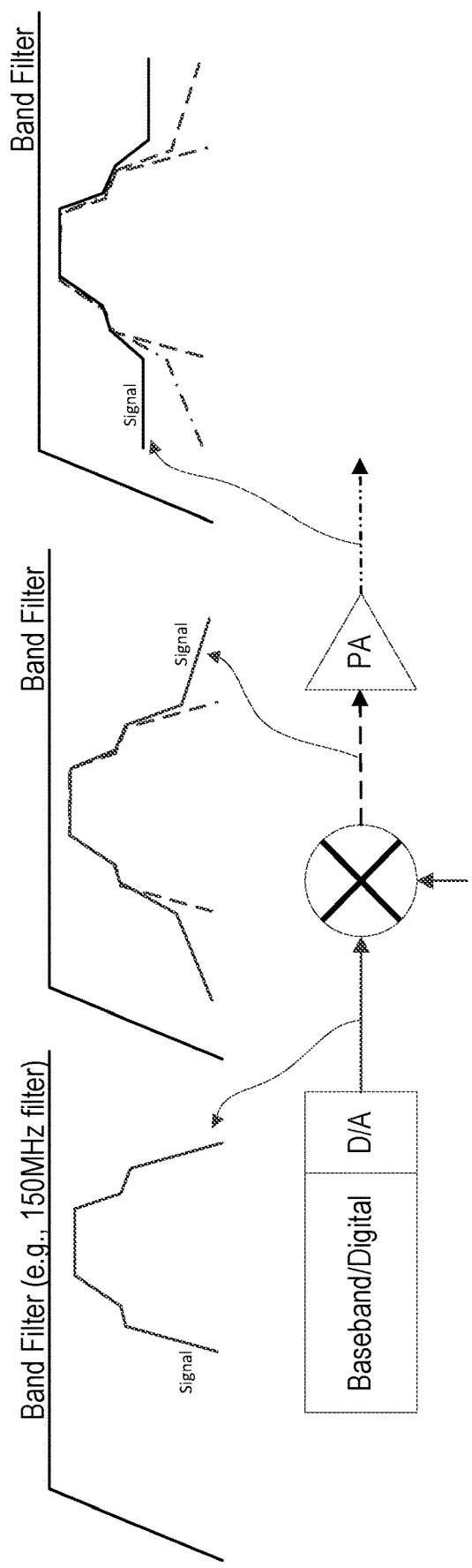
FIG. 8 is a diagram of the effect of transmission properties of a radio device on a signal.
Figure 9:
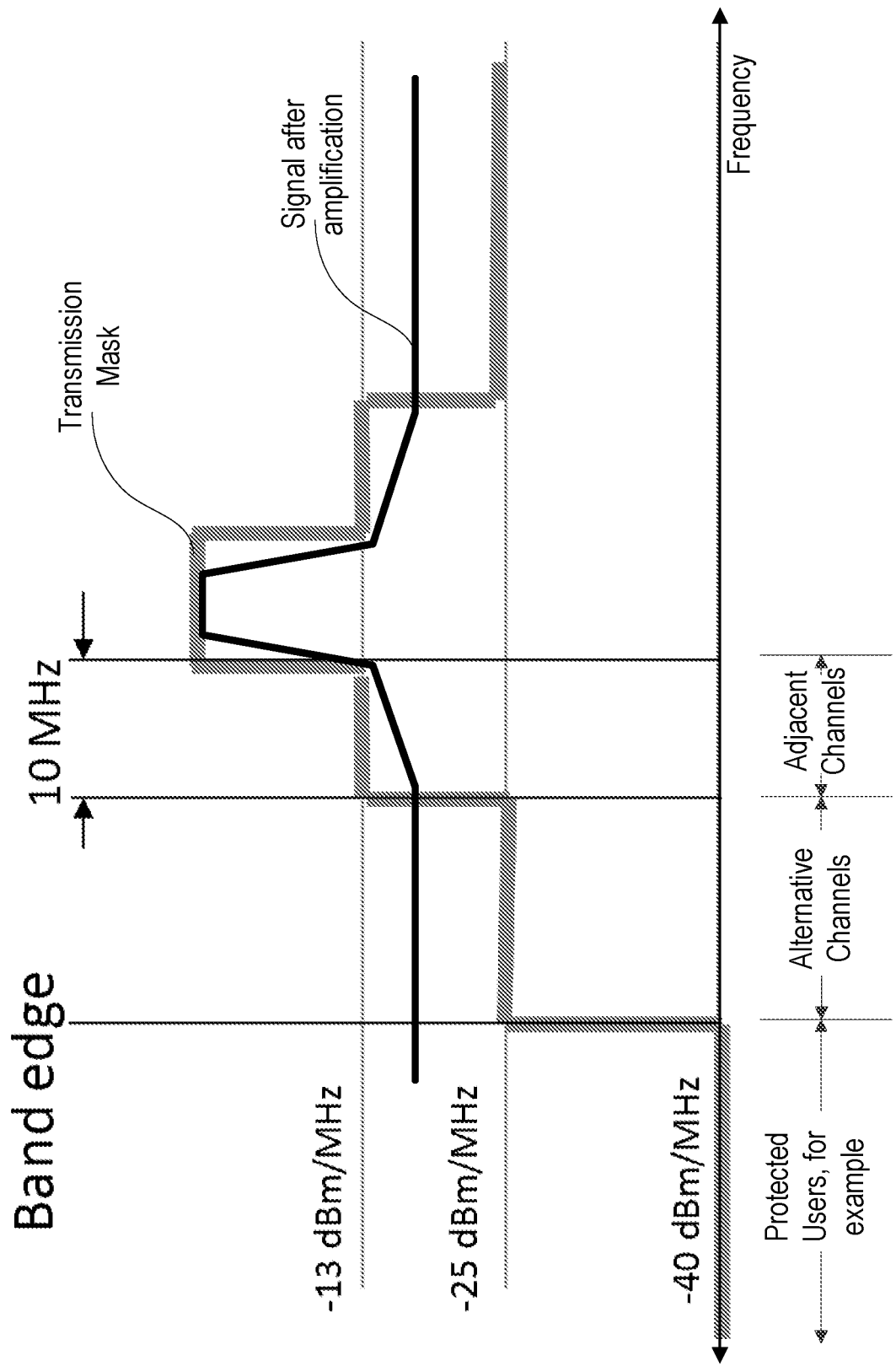
FIG. 9 is a diagram of the signal of FIG. 8 mapped to a transmission mask according to CBSD emission requirements.

Before describing in detail exemplary embodiments, it is noted that the embodiments reside primarily in combinations of apparatus components and processing steps related to the classification of interference connections between Citizens Broadband Radio Service Devices, CBSDs 2, and performing at least one action based on the classification of interference connections. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The term "wireless device", also referred to as "used herein may refer to any type of wireless device communicating with a network node and/or with another wireless device in a cellular or mobile communication system. Examples of a wireless device are user equipment (UE), end user device (EUD), target device, device to device (D2D) wireless device, machine type wireless device or wireless device capable of machine to machine (M2M) communication, a sensor equipped with UE, PDA, iPAD, Tablet, mobile terminals, smart phone, laptop embedded equipped (LEE), laptop mounted equipment (LME), USB dongles, computer premises equipment (CPE), etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), Spectrum Access System (SAS), Citizens Broadband Radio Service Device (CBSD), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to classifying an interference connection of multiple CBSDs 2 and performing at least one action based on the classification of the interference connection where the at least one action may help mitigate at least some of the interference between the CBSDs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The CBRS Alliance coexistence task group is proposing that the Coexistence Manager build a connected set of CBSDs 2, and should use the connected set as an input to the channel assignment algorithm. Two CBSDs 2 are deemed to be connected by an edge in the connected set if there is a coverage overlap between the two CBSDs 2. The threshold for defining the CBSD 2 coverage has not been fixed yet, but it has been proposed to use a value of −80 dBm/10 MHz.

Some embodiments provide a classification of the connections between the CBSDs 2 depending on the interference conditions. A goal is to identify the interference conditions that will impact channel assignments to the two connected CBSDs 2.

In one example, one coexistence group, dedicated to the CBRS Alliance, may be managed by one or more Coexistence Managers (CxMs). CBSDs that are members of the same ICG may independently manage the interference, and hence they do not require a CxM to handle the interference for them. CBSDs that are members of the same CCG are requesting the CxM to assign them to the same channel.

It may be assumed that the CBSDs 2 belonging to the same ICG will use the same TDD configuration in order to avoid downlink/uplink (DL/UL) interference. Members of different ICGs can request for different TDD configurations, but this may result in potential interference scenarios as described later.

Figure 10:
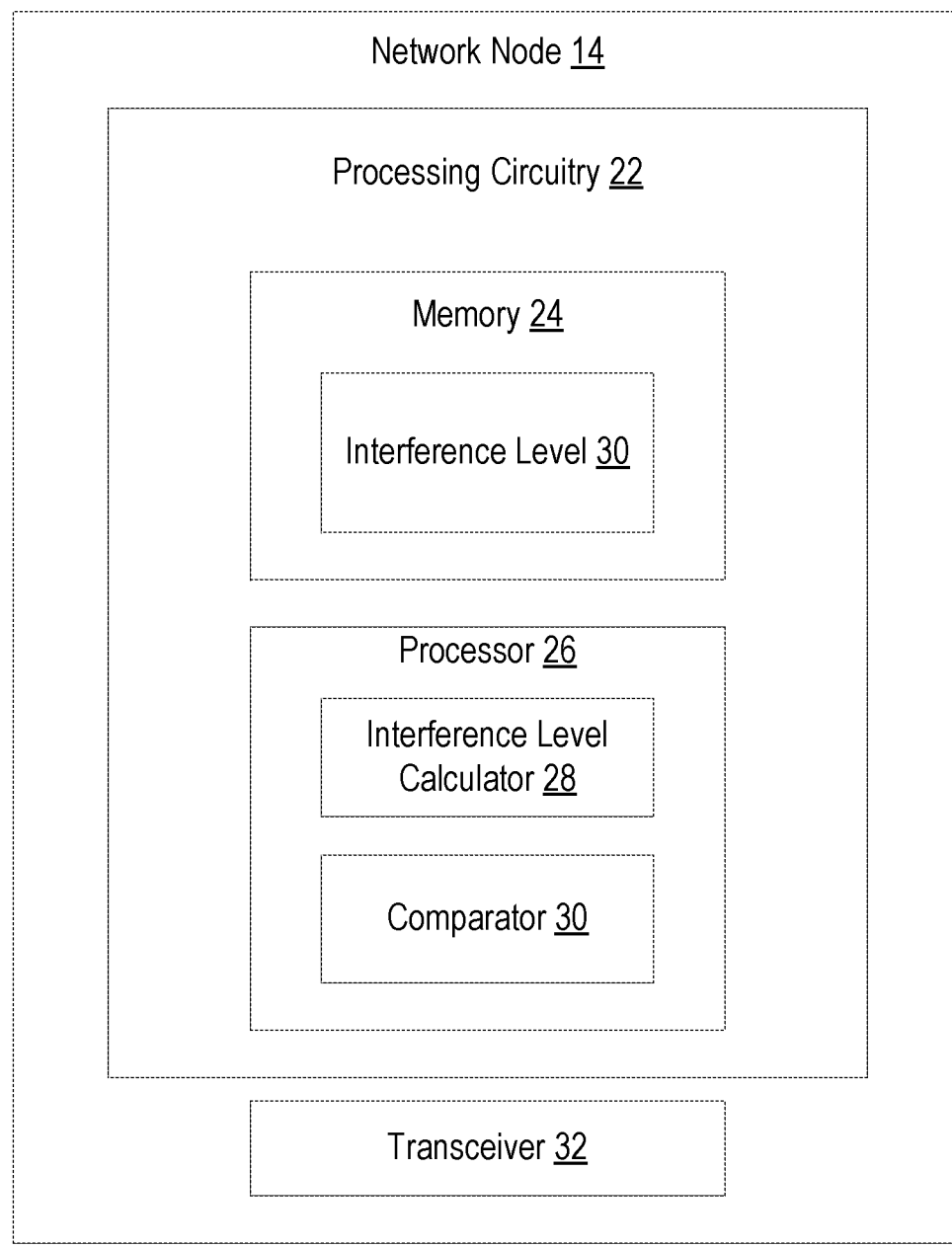
FIG. 10 is a block diagram of a network node configured in accordance with principles set forth herein.

FIG. 10 is a block diagram of a network node 14 configured for classification of interference connections between Citizens Broadband Radio Service Devices, CBSDs 2, in a wireless communication network. In some embodiments, the network node 14 can be a SAS 6, CxM or EMS that is modified to perform the functions described herein. The network node 14 has processing circuitry 22. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store interference levels 30 calculated by an interference level calculator 28. The interference level calculations are based on whether two interfering CBSDs 2 are operating in one of alternate channels, adjacent channels and the same channel. A comparator 30 is configured to compare the calculated interference level to a threshold to determine a classification of an interference connection. The transceiver 32 communicates with one or more network entities such as CBSDs 2 and other wireless devices 10.

Figure 11:
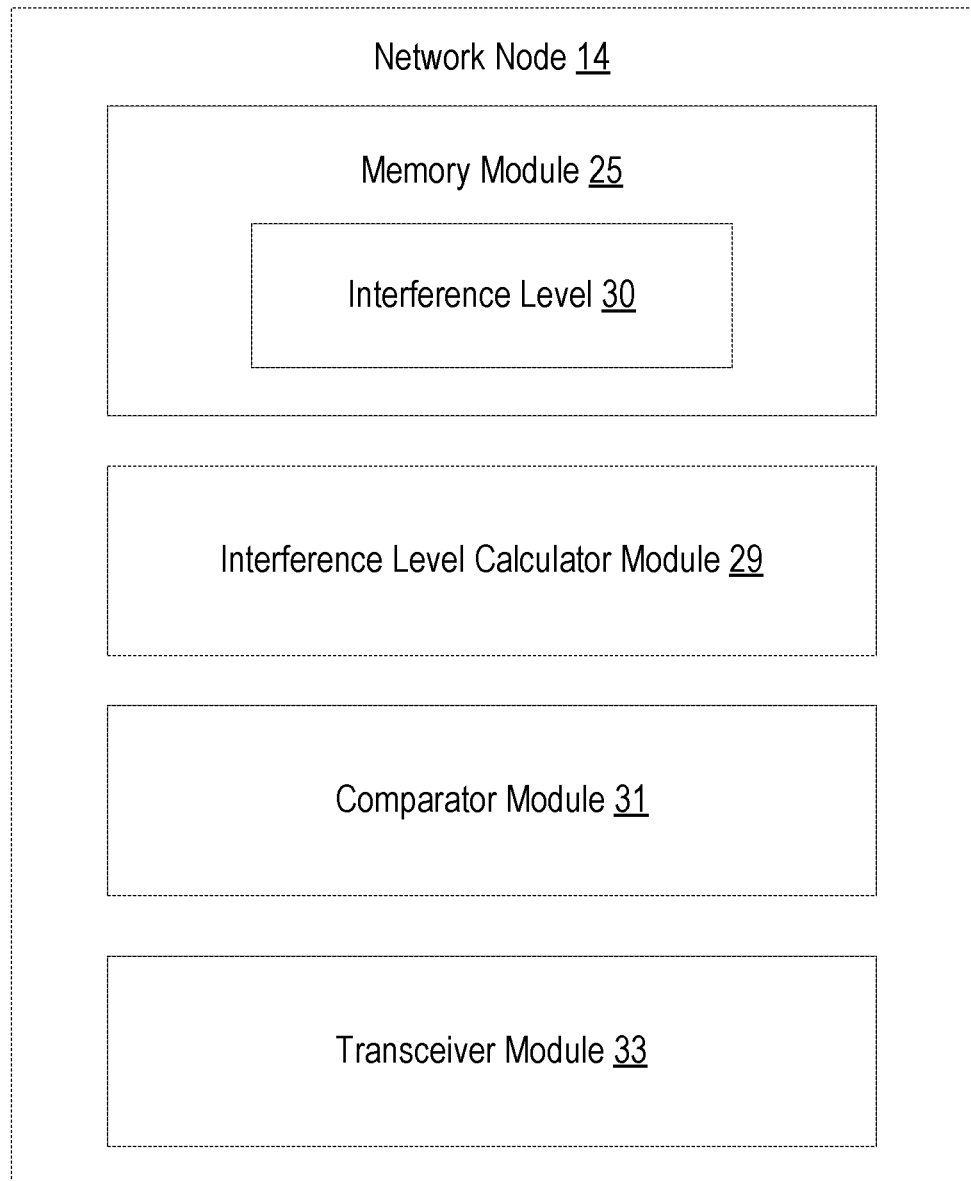
FIG. 11 is a block diagram of an alternative embodiment of a network node configured in accordance with principles set forth herein.

FIG. 11 is a block diagram of an alternative embodiment of a network node 14 which can be implemented at least in part by software modules having computer code executable by a processor. The network node 14 includes a memory module 25 configured to store interference levels 30. An interference level calculator module 29 configured to calculate an interference level, the calculation is based on whether two interfering CBSDs 2 are operating in one of alternate channels, adjacent channels and the same channel. The network node 14 also includes a comparator module 31 configured to compare the calculated interference level to a threshold to determine a classification of an interference connection. The network node 14 also includes a transceiver module 33 configured to communicate wirelessly with a CBSD 2.

Figure 12:
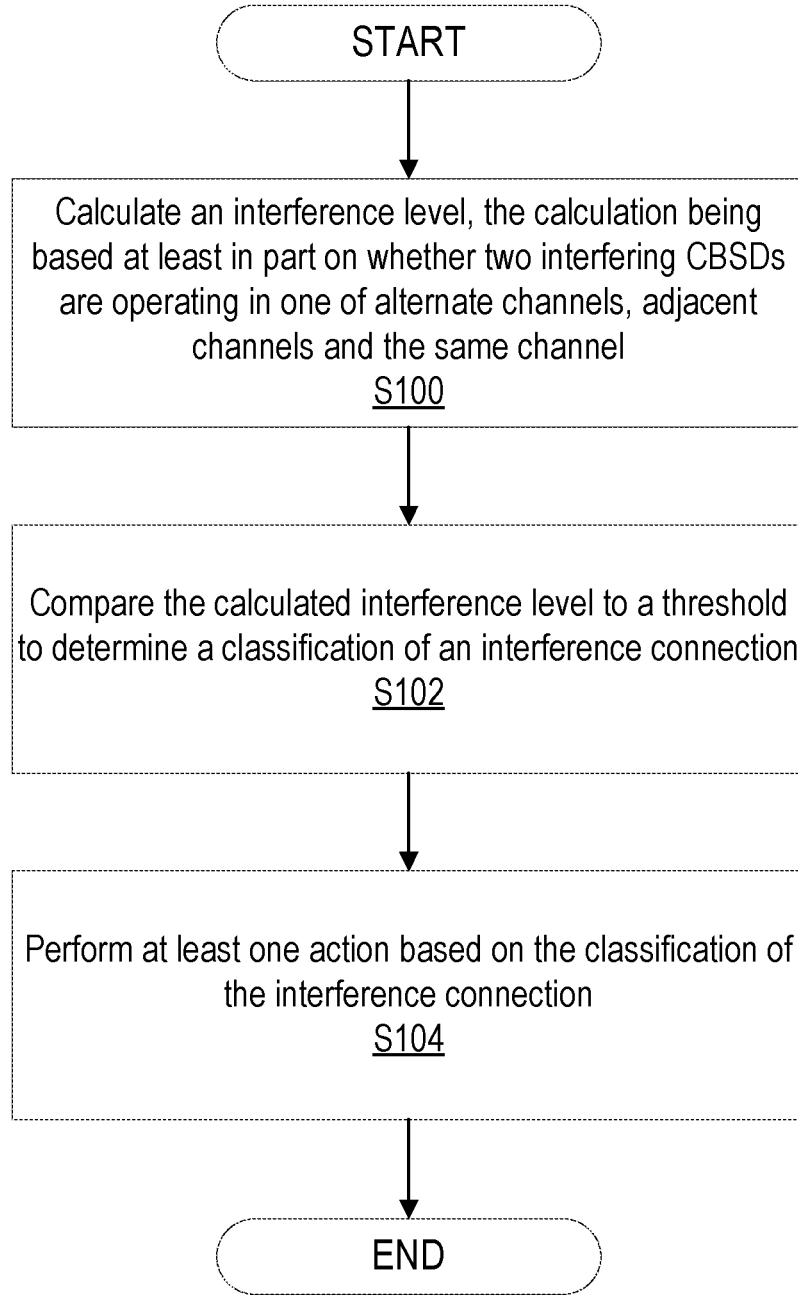
FIG. 12 is a flowchart of an exemplary process for classification of interference connections between CBSDs in accordance with principles set forth herein

FIG. 12 is a flowchart of an exemplary process for classification of interference connections between Citizens Broadband Radio Service Devices, CBSDs 2, in a wireless communication network. The process includes calculating, via the interference level calculator 28 and/or processing circuitry 22, an interference level, the calculation is based on whether two interfering CBSDs 2 are operating in one of alternate channels, adjacent channels and the same channel (Block S100). The process also includes comparing, via the comparator 32 and/or processing circuitry 22, the calculated interference level to a threshold to determine a classification of an interference connection (Block S102). The process also includes performing, via the processing circuitry 22, at least one action based on the classification of the interference connection (Block S104).

In some embodiments, the at least one action includes making/performing channel assignments based on the classification of interference connections. According to one embodiment of this aspect, the at least one action includes performing channel assignments based on the classification of interference connections. According to one embodiment of this aspect, the interference connection between the two interfering CBSDs 2 does not allow the CBSDs 2 to operate in a Citizen's Broadband Radio Service, CBRS, band without incurring interference above a predefined threshold if the CBSDs 2 are part of different coexistence groups or the CBSDs 2 use different radio access technologies, RATs.

According to one embodiment of this aspect, the interference connection between the two interfering CBSDs 2 does not allow the CBSDs 2 to operate in the Citizen's Broadband Radio Service, CBRS, band without incurring interference about a predefined threshold if the CBSDs 2 have overlapping downlink and uplink cycles, regardless of the existence of a guard band between channels assigned to the CBSDs 2. According to one embodiment of this aspect, the interference connection between the two interfering CBSDs 2 does not allow the CBSDs 2 to operate in adjacent channels without incurring interference about a predefined threshold if the CBSDs 2 use different RATs or overlapping downlink and uplink cycles.

According to one embodiment of this aspect, the interference connection between the two interfering CBSDs 2 is associated with a guard band greater than a predefined bandwidth. According to one embodiment of this aspect, the interference connection between the two interfering CBSDs 2 does allow CBSDs 2 to operate in different channels without incurring interference above a predefined threshold if CBSDs 2 use different RATs or overlapping downlink and uplink cycle. According to one embodiment of this aspect, the different channels between the CBSDs 2 are orthogonal to each other.

According to one embodiment of this aspect, the interference threshold is one of static, dynamic and based on a probability distribution of received interference levels at the CBSDs 2. According to one embodiment of this aspect, the at least one action includes applying at least one network policy to reduce interference associated with the CBSDs 2. According to one embodiment of this aspect, the network node is a spectrum access system, SAS. According to one embodiment of this aspect, the network node 14 is a Coexistence Manager, CxM.

Some embodiments produce a classification of interference connections between CBSDs 2 and specifies how these connections need to be handled by SAS 6 and CxM. CBRS band offers a unique opportunity for the central entities like SAS 6 and CxM, that have access to CBSD 2 information, to calculate interference types between CBSDs 2 and apply different policies to manage interference.

Having generally described arrangements for classification of an interference connection and performing at least one action based on a classification of an interference connection between CDSDs 2, details for these arrangements, functions and processes are provided as follows, and which may be implemented by the network node 14.

Embodiment 1: Co-Existence Connected Set Classifications with Static Thresholds

The SAS 6's, i.e., network node 14's, ability to break a connected set into multiple independent CxG connected sets can be impacted by the type of interference connections between the CBSDs 2. For this purpose, this method defines the following classification of the CBSD connections in the SAS 6, i.e., network node 14, connected set:

Type 1 Connection: Connected CBSDs 2 cannot use different technologies or overlapping UL/DL cycles regardless of the guard band between the channels assigned to the two CBSDs 2;

Type 2 Connection: Connected CBSDs 2 cannot use different technologies or overlapping UL/DL cycles if the assigned channels are adjacent; and Type 3 Connection: Connected CBDSs could potentially use different technologies or overlapping UL/DL in different channels.

Figure 13:
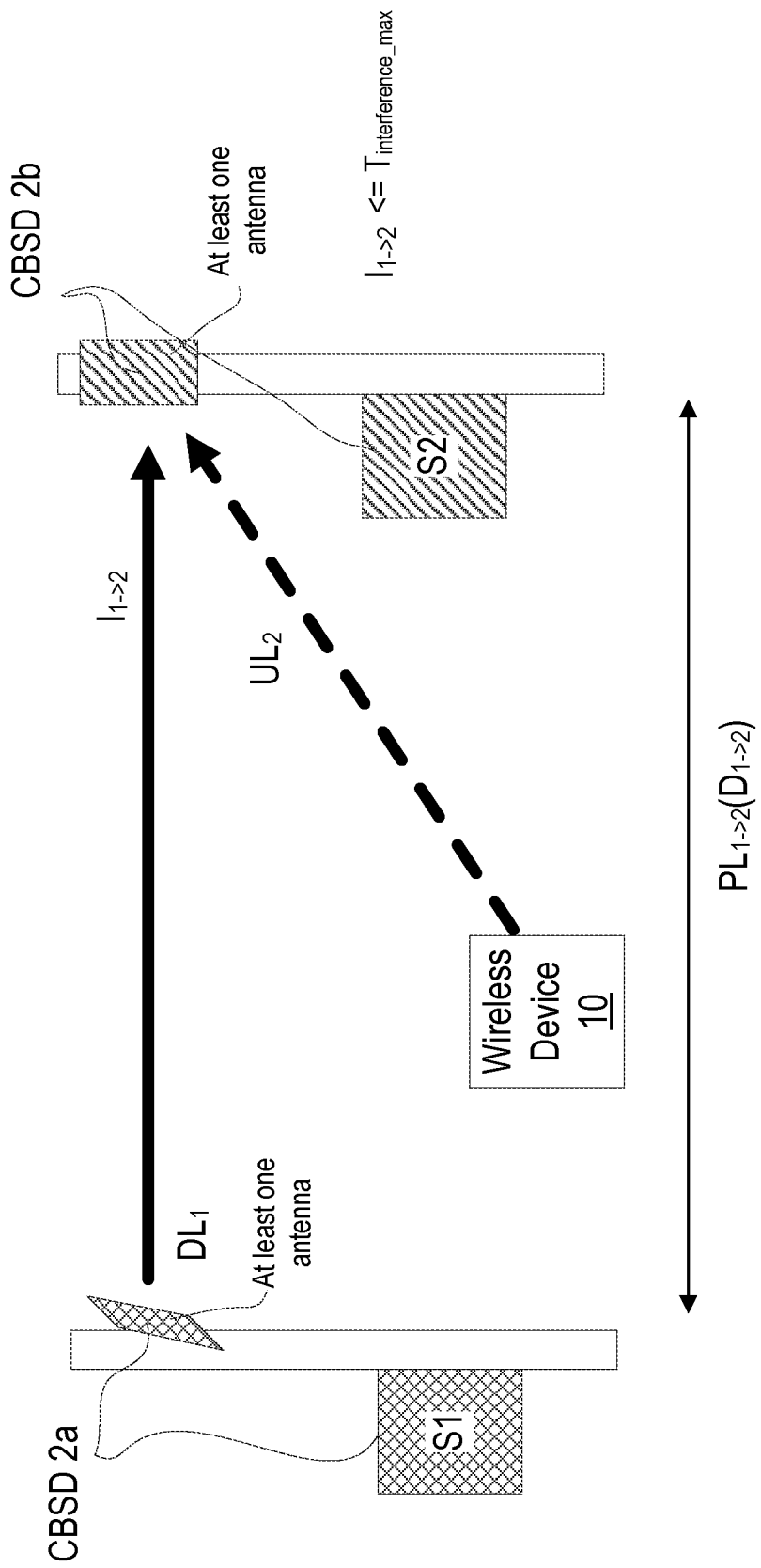
FIG. 13 is a diagram of an uplink interference scenario in a SAS architecture.

To explain the classification of the CBSD connections, the scenario is described in FIG. 13. Device S1, registered to SAS as CBSD 2a, is the aggressor operating in $ch_1$ in DL mode as the downlink signal 1 ($DL_1$) is being detected at CBSD 2b as interference. Device S2, registered as CBSD 2b and operating in $ch_2$ in UL mode, is the victim as both uplink signal 1 ($UL_2$) and unwanted $DL_1$ are being detected by CBSD 2b. In one or more embodiments, CBSD 2a and CBSD 2b are in communication with and/or managed by one or more SASs 6, i.e., network nodes 14 (not shown in FIG. 13). It is assumed that the transmissions between the two CBSDs 2 are unsynchronized and as such a worst-case condition can occur in which the S1 aggressor is in DL transmission mode and the device S2 victim is in an UL transmission mode. For the proper reception of the UL signal from a wireless device 10 associated to CBSD 2b, it is assumed that the maximum acceptable interference level from CBSD 2a should be a threshold $T_{interference\_max}$. For example, $T_{interference\_max}$ can be set to −80 dBm/10 MHz, i.e. $I_{1->2}<=-80$ dBm/10 MHz. Higher values of interference threshold can also be used to provide a minimum performance level.

An assumption is made that the CBSDs 2 use 10 MHz channels. The formula for the interference level is:

$$I_{1->2}=P_1+G_{1->2}-PL_{1->2}$$

Where:

$P_1$ is the conducted power that the CBSD 2a is transmitting in the channel $ch_2$ used by CBSD 2b;
   a) For alternate channels: $P_1$=−25 dBm/MHz=−15 dBm/10 MHz, for example;
   b) For adjacent channels: $P_1$=−13 dBm/MHz=−3 dBm/10 MHz, for example;

$G_{1->2}$ includes both aggressor transmit (Tx) gain and victim receive (Rx) gain
   a) $G_{1->2}$ is usually between −20 dBi to 30 dBi, for example;

$PL_{1->2}$ is the path loss between CBSD 2a and CBSD 2b. As used in one or more examples, subscript "1" is associated with CBSD 2a and subscript "2" is associated with CBSD 2b. "G" denotes gain, I denotes interference, P denotes power while PL denotes path loss. Path loss may be determined using theoretical propagation models that are known in the art. In one or more embodiments, the propagation model may use additional data such as actual/measured data associated with interference distribution to increase the accuracy of estimated path loss. For example, SAS 6, i.e., network node 14, has access to measurements to build a cumulative distribution function (CDF) of probability for determining path loss.

Consider that the two channels assigned to the CBSDs 2 are alternate channels (i.e. channels with at least a guard band of $f_{guard}$ frequency gap between them). Without loss of generality, it may be assumed that, for this example, $f_{guard}$=10 MHz, then $P_1$ will be given by the FCC emission mask requirements $P_1$=−25 dBm/MHz=−15 dBm/10 MHz. If the channels are adjacent channels, then $P_1$ will be given by the FCC emission mask requirements $P_1$=−13 dBm/MHz=−3 dBm/10 MHz. If the CBSDs 2 are operating in the same channel (co-channel), then instead of $P_1$, the max effective isotropic radiated power (EIRP) power level for CatA or CatB devices may be used.

Interference Connection Type 1: Connected CBSDs 2 cannot use different technologies or overlapping UL/DL cycles regardless of the guard band between the channels assigned to the two CBSDs 2.

For alternate channels, $P_1$=−15 dBm/10 MHz, and considering the cases where the interference threshold is exceeded=>

$I_{1->2}=P_1+G_{1->2}-PL_{1->2}>T_{interference\_max}$=>
$PL_{1->2}<-15-T_{interference\_max}+G_{1->2}$
Assuming $T_{interference\_max}$=−80 dBm/10 MHz=>
$PL_{1\_>2}<65+G_{1->2}$ So, if the path loss between the two CBSDs 2 meet the above formula, the two CBSDs 2 are considered to have an Interference connection of Type 1. This is equivalent to:

Assume $G_{1\to 2}=6$ dBi=>$PL_{1\to 2}<71$ dB=>$D_{1\to 2}<23$m (free space propagation)

Assume $G_{1\to 2}=0$ dBi=>$PL_{1\to 2}<65$ dB=>$D_{1\to 2<11}$m (free space propagation)

Assume $G_{1\to 2}=18$ dBi=>$PL_{1\to 2}<83$ dB=>$D_{1\to 2}<94$m (free space propagation)

Note that the output power of the aggressor in channel $ch_1$ does not impact the equation, so reducing the output power of an aggressor, i.e., CBSD 2a, does not solve this problem. In practice, reducing the power of the aggressor may have a positive effect, but it might not be enough to solve the interference problem.

Interference Connection Type 2: Connected CBSDs 2 cannot use different technologies or overlapping UL/DL cycles if the assigned channels are adjacent.

For adjacent channels, $P_1=-3$ dBm/10 MHz=>

$PL_{1\to 2}<-3-T_{interference\_max}+G_{1\to 2}$ $PL_{1\to 2}<77+G_{1\to 2}$

This is equivalent to:

Assume $G_{1\to 2}=6$ dBi=>$PL_{1\to 2}<83$ dB=> $<=D_{1\to 2}<94$m (free space propagation);

Assume $G_{1\to 2}=0$ dBi=>$PL_{1\to 2}<77$ dB=>$D_{1\to 2}<47$ m(free space propagation); and Assume $G_{1\to 2}=18$ dBi=>$PL_{1\to 2}<95$ dB=>$D_{1\to 2}<375$m (free space propagation).

Interference Connection Type 3: Connected CBDSs 2 can potentially use different technologies or overlapping UL/DL in different channels. In this case, the interference threshold is met, resulting in the following formula:

$$PL_{1\to 2}>=77+G_{1\to 2}$$

However, this case requires more considerations regarding the impact on the wireless device 10 DL signal interference, as described later.

A potential Interference Connection Type 4 can also be considered, where the connected CBDSs 2 can use different technologies or overlapping UL/DL in the same channel, but in this case, the two CBSDs 2 are no longer connected and hence the type 4 connection may not appear in practice.

The different types of interference connections may have to be handled differently by the SAS 6, i.e., network node 14, and CxM, i.e. network node 14:

Type 1

Difficult case where the main coexistence tools (e.g., reducing output power and adding guard band between channels) cannot solve the interference problem;

This type of connection may require manual intervention if the CBSDs 2 are part of different CxGs, like for example:

Coordinating deployments between operators:
  Increasing isolation between CBSDs 2;
  Coordinating technologies;
  Business arrangements; and If CBSDs 2 are part of the same CxG, the type 1 connection may require the use of same UL/DL configuration.

Type 2 may require a guard band of 10 MHz if CBSDs 2 are part of different CxGs;

may require a guard band of 10 MHz if CBSDs 2 want to use different UL/DL configuration; and SAS 6, i.e., network node 14, via processing circuitry 22, can use this information when dividing the spectrum between CxGs, and CxM, i.e. network node 14, can use this info when dividing the spectrum between TDD and listen before talk (LBT) or between different subgroups using different LTE TDD configurations.

Type 3

Figure 14:
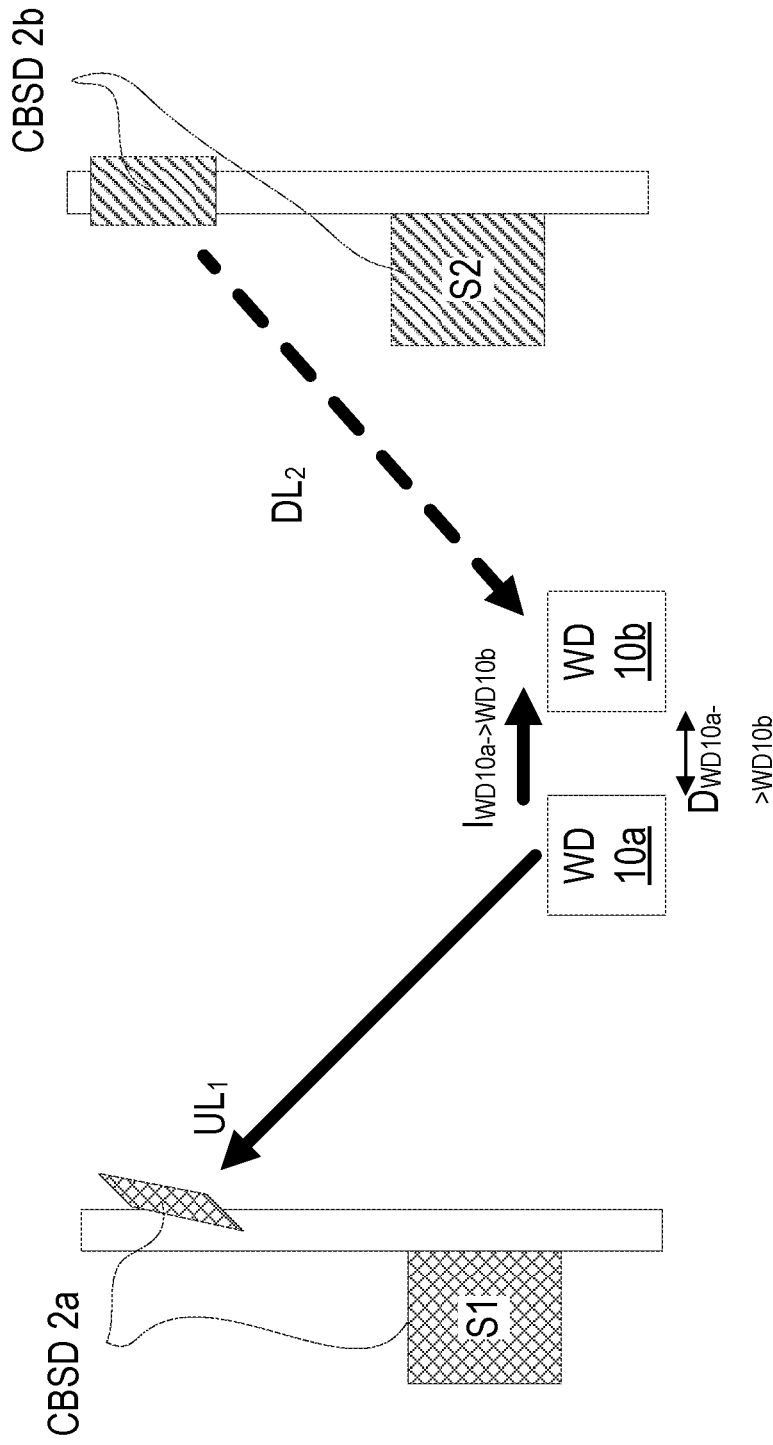
FIG. 14 is a diagram of a downlink interference scenario in a SAS architecture.

For these connection types, a further analysis may be required before deciding how to handle them where one example is illustrated in FIG. 14, described below. However, as explained below, this analysis may not be done at the SAS, i.e., network node 14, or CxM, i.e. network node 14, level, so a generic solution cannot be specified in the context of the CBRS 2 framework.

For type 3 connections, the CxM, i.e. network node 14, can use the coloring algorithm, as specified in the CBRS Alliance Technical Report to orthogonalize channels between CBSDs 2. In fact, the coloring algorithm can also be used for type 1 and type 2 interference connections as long as the CBSDs 2 are using the same LTE TDD UL/DL configuration.

Therefore, SAS 6 or CxM, i.e., network node 14, via processing circuitry 22, may classify the interference connection between CBDSs 2 to be one of the above types (i.e., Type 1, Type 2, etc.), and may perform at least one action such as channel assignment and/or dividing up the spectrum based on the classification of the interference connection. In one or more embodiments, by classifying interference of a vast amount of scenarios into one of these specific interference types, the disclosure advantageously allows the mitigation tools to be selected and implemented in a low complexity manner. For example, in various different scenarios classified as interference type 1, the same mitigation tool(s) can be implemented, thereby reducing complexity in interference management.

FIG. 14 shows the DL impact that can result due to uncoordinated deployments.

Wireless device (WD) 10a is the aggressor, using channel ch1, in UL mode. Wireless device 10b is the victim, using channel $ch_2$, in DL mode. The acceptable Interference threshold is $T_{interference\_max}$ (for example −80 dBm/10 MHz)

$I_{WD10a\to WD10b}=P_{WD10a}-ACIR_{WD10a\to WD10b}-PL_{WD10a\to WD10b}$ $I_{WD10a\to WD10b}<=T_{interference\_max}$ $P_{WD10a}$ is the conducted power emitted by wireless device 10a in channel $ch_1$:

Max 23 dBm/10 MHz $ACIR_{WD10a\to WD10b}=28$ dB

For example, If $PL_{WD10a\to 2}<65$ dB (equivalent to $D_{WD10a\to WD10b}<11$m), the DL could be impacted. However, SAS 6, i.e., network node 14, has no information about the wireless device 10 position and the effective wireless device 10 transmit power, hence it may not be able to evaluate wireless device 10 interference impacts. Therefore, the type 2 and type 3 interference connection types cannot be detected by SAS 6, i.e., network node 14, or CxM, i.e. network node 14, and they are left to be handled by the network operators.

Embodiment #2: Variable Threshold Co-Existence Connected Set Classifications

In Embodiment #1, the connection set thresholds defined for the different connection set types were static. In this embodiment, the connection set thresholds for connections can be also, semi-static or dynamic fixed values defined by the SAS 6, i.e. network node 14, or CxM, i.e. network node 14. Semi-static connection set thresholds can be modified on a daily basis or less over an interval consistent with a grant period for a CBSD 2, whereas dynamic connection set thresholds can be modified within a grant period of a CBSD 2.

Embodiment #3: Soft-Value Threshold Co-Existence Connected Set Classifications In Embodiments #1 and #2, the connection set thresholds defined for the different connection set types could static, semi-static or dynamic, but were based on fixed threshold values. In this embodiment, the connection set thresholds defined by the SAS 6, i.e. network node 14, or CxM, i.e. network node 14, can be probabilistic soft values. Due to the random nature of the propagation channel such as log-normal shadowing, fast fading, additive white Gaussian noise and other random channel impairments, the measured interference between CBSDs 2 as well as between CBSDs 2 and protection points may be by definition a random variable. Based on this randomness the connection set threshold $T_{interference\_max}$ can be associated with a probability of occurrence $P_{interference\_max}$. The pair ($T_{interference\_max}$, $P_{interference\_max}$) can be set by the SAS 6, i.e. network node 14, CxM, i.e. network node 14, or domain proxy in a static, semi-static or dynamic manner based on a probability of achieving a desired quality of service metric between CBSDs 2 such as signal to interference plus noise ratio (SINR), SLNR (signal loss to noise ratio) or other probabilistic measures.

Some Other Embodiments

Embodiment 1A

A method in a network node 14 for classification of interference connections between Citizens Broadband Radio Service Devices, CBSDs 2, in a wireless communication network, the method comprising:
calculating an interference level, the calculation being based on whether two interfering CBSDs 2 are operating in one of alternate channels, adjacent channels and the same channel; and
comparing the calculated interference level to a threshold to determine a classification of an interference connection.

Embodiment 2A

The method of Embodiment 1A, further comprising making channel assignments based on the classification of interference connections.

Embodiment 3A

The method of any of Embodiments 1A and 2A, wherein an interference connection between the two interfering CBSDs 2 is one of:
a type 1 connection wherein the CBSDs 2 may not use different radio access technologies, RATs, and overlapping downlink and uplink cycles regardless of an existence of a guard band between channels assigned to the CBSDs 2;
a type 2 connection wherein the CBSDs 2 may not use different RATs and overlapping downlink and uplink cycles when the channels assigned to the CBSDs 2 are adjacent; and
a type 3 connection wherein the CBSDs may use different RATs and overlapping downlink and uplink cycles in different channels.

Embodiment 4A

The method of any of Embodiments 1A-3A, wherein the threshold is static.

Embodiment 5A

The method of any of Embodiments 1A-3A, wherein the threshold is dynamic.

Embodiment 6A

The method of any of Embodiments 1A-3A, wherein the threshold is determined probabilistically.

Embodiment 7A

The method of any of Embodiments 1A-6A, wherein the network node 14 is a spectrum access system, SAS 6.

Embodiment 8A

The method of any of Embodiments 1A-6A, wherein the network node 14 is a Coexistence Manager, CxM.

Embodiment 9A

A network node 14 for classification of interference connections between Citizens Broadband Radio Service Devices, CBSDs 2, in a wireless communication network, the network node 14 comprising:
processing circuitry 22 configured to:
calculate an interference level, the calculation being based on whether two interfering CBSDs 2 are operating in one of alternate channels, adjacent channels and the same channel; and
compare the calculated interference level to a threshold to determine a classification of an interference connection.

Embodiment 10A

The network node 14 of Embodiment 9A, further comprising making channel assignments based on the classification of interference connections.

Embodiment 11A

The network node 14 of any of Embodiments 9A and 10A, wherein an interference connection between the two interfering CBSDs 2 is one of:
a type 1 connection wherein the CBSDs 2 may not use different radio access technologies, RATs, and overlapping downlink and uplink cycles regardless of an existence of a guard band between channels assigned to the CBSDs 2;
a type 2 connection wherein the CBSDs 2 may not use different RATs and overlapping downlink and uplink cycles when the channels assigned to the CBSDs 2 are adjacent; and
a type 3 connection wherein the CBSDs 2 may use different RATs and overlapping downlink and uplink cycles in different channels.

Embodiment 12A

The network node 14 of any of Embodiments 9A-11A, wherein the threshold is static.

Embodiment 13A

The network node 14 of any of Embodiments 9A-11A, wherein the threshold is dynamic.

Embodiment 14A

The network node 14 of any of Embodiments 9A-11A, wherein the threshold is determined probabilistically.

Embodiment 15A

The network node 14 of any of Embodiments 9A-14A, wherein the network node is a spectrum access system, SAS 6.

Embodiment 16A

The network node 14 of any of Embodiments 9A-14A, wherein the network node 14 is a Coexistence Manager, CxM.

Embodiment 17A

A network node 14 for classification of interference connections between Citizens Broadband Radio Service Devices, CBSDs 2, in a wireless communication network, the network node 14 comprising:
 an interference level calculation module 29 configured to calculate an interference level, the calculation being based on whether two interfering CBSDs 2 are operating in one of the alternate channels, adjacent channels and the same channel; and
 a comparator module 31 configured to compare the calculated interference level to a threshold to determine a classification of an interference connection.

| Abbreviation | Explanation |
| --- | --- |
| ASA | Authorized Shared Access |
| CBRS | Citizen's Broadband Radio Service |
| CBSD | Citizens Broadband Radio Service Device |
| CCG | Common Channel Group: A group of CBSDs, that are part of the same ICG, requiring a common primary channel assignment. The common primary channel assignment will be fulfilled by the CxM only for the CBSDs that have overlapping coverage. |
| Connected Set | Set of CBSDs belonging to a connected component of a graph created at the SAS or CxM |
| CxG | Coexistence Group: A group of CBSDs that coordinate their own interference within the group according to a common interference management policy |
| CxM | Coexistence Manager: A logical entity responsible for managing coexistence between GAA users within a CxG in coordination with SAS, according to the common interference management policy |
| ESC | Environmental Sensing Capability |
| EUD | End User Device |
| GAA | General Authorized Access |
| ICG | Interference coordination group |
| LSA | Licensed Shared Access |
| PAL | Priority Access License |
| PE | Protected Entity |
| PL | Path Loss |
| PPA | PAL Protection Area |
| RAT | Radio Access Technology |
| SAS: | Spectrum Access System |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node in a wireless communication network, the network node comprising:
    processing circuitry configured to:
        classify a measured interference between Citizen Broadband Service Devices, CBSDs, having a coverage overlap, to a first classification of a plurality of classifications, the first classification indicating whether at least one of different radio access technologies, RATs, and overlapping uplink, UL, and downlink, DL, cycles is allowed, the classification of the measured interference to the first classification being based at least in part on:
            whether the interference between the CBSDs is associated with one of alternative channels and adjacent channels;
            measurements of the interference between the CBSDs; and
        perform at least one action based on the classification of the measured interference to the first classification, the at least one action including performing channel assignments; and
        the interference between the two interfering CBSDs does not allow the CBSDs to operate in a Citizen's Broadband Radio Service, CBRS, band without incurring interference above a predefined threshold if the CBSDs are part of different coexistence groups or the CBSDs use different radio access technologies, RATs.

2. The network node of claim 1, wherein the interference between the two interfering CBSDs does not allow the CBSDs to operate in the Citizen's Broadband Radio Service, CBRS, band without incurring interference about a predefined threshold if the CBSDs have overlapping downlink and uplink cycles, regardless of the existence of a guard band between channels assigned to the CBSDs.

3. The network node of claim 1, wherein the interference between the two interfering CBSDs does not allow the CBSDs to operate in adjacent channels without incurring interference about a predefined threshold if the CBSDs use different RATs or overlapping downlink and uplink cycles.

4. The network node of claim 3, wherein the interference between the two interfering CBSDs is associated with a guard band greater than a predefined bandwidth.

5. The network node of claim 1, wherein the interference between the two interfering CBSDs does allow CBSDs to operate in different channels without incurring interference above a predefined threshold if CBSDs use different RATs or overlapping downlink and uplink cycle.

6. The network node of claim 5, wherein the different channels between the CBSDs are orthogonal to each other.

7. The network node of claim 1, wherein the interference threshold is one of static, dynamic and based on a probability distribution of received interference levels at the CBSDs.

8. The network node of claim 1, wherein the at least one action includes applying at least one network policy to reduce interference associated with the CBSDs.

9. The network node of claim 1, wherein the network node is a spectrum access system, SAS.

10. The network node of claim 1, wherein the network node is a Coexistence Manager, CxM.

11. A method for a network node for classification of interference between Citizens Broadband Radio Service Devices, CBSDs, in a wireless communication network, the method comprising:
    classifying a measured interference between Citizen Broadband Service Devices, CBSDs, having a coverage overlap, to a first classification of a plurality of classifications, the first classification indicating whether at least one of different radio access technologies, RATs, and overlapping, UL, and downlink, DL, cycles is allowed, the classification of the measured interference to the first classification being based at least in part on:
        whether the measured interference between the CBSDs is associated with one of alternative channels and adjacent channels;
        measurements of the interference between the CBSDs; and
        performing at least one action based on the classification of the measured interference to the first classification, the at least one action including performing channel; and
    the interference between the two interfering CBSDs does not allow the CBSDs to operate in a Citizen's Broadband Radio Service, CBRS, band without incurring interference above a predefined threshold if the CBSDs are part of different coexistence groups or the CBSDs use different radio access technologies, RATs.

12. The method of claim 11, wherein the interference between the two interfering CBSDs does not allow the CBSDs to operate in a Citizen's Broadband Radio Service, CBRS, band without incurring interference above a predefined threshold if the CBSDs have overlapping downlink and uplink cycles, regardless of the existence of a guard band between channels assigned to the CBSDs.

13. The method of claim 11, wherein the interference between the two interfering CBSDs does not allow the CBSDs to operate in adjacent channels without incurring interference above a predefined threshold if the CBSDs use different RATs or overlapping downlink and uplink cycles.

14. The method of claim 13, wherein the interference between the two interfering CBSDs is associated with a guard band greater than a predefined bandwidth.

15. The method of claim 11, wherein the interference between the two interfering CBSDs does allow CBSDs to operate in different channels without incurring interference above a predefined threshold if CBSDs use different RATs or overlapping downlink and uplink cycles.

16. The method of claim 15, wherein the different channels between the CBSDs are orthogonal to each other.

17. The method of claim 11, wherein the interference threshold is one of static, dynamic and based on a probability distribution of received interference levels at the CBSDs.

18. The method of claim 11, wherein the at least one action includes applying at least one network policy to reduce interference associated with the CBSDs.

19. The method of claim 11, wherein the network node is a spectrum access system, SAS.

20. The method of claim 11, wherein the network node is a Coexistence Manager, CxM.

\* \* \* \* \*